United States Patent [19]
Hunt et al.

[11] Patent Number: 5,898,671
[45] Date of Patent: Apr. 27, 1999

[54] TRANSMITTER CONTROLLED FLOW CONTROL FOR BUFFER ALLOCATION IN WIDE AREA ATM NETWORKS

[75] Inventors: Douglas H. Hunt, Sudbury; Raj Krishnan Nair, Acton, both of Mass.

[73] Assignees: Fujitsu Network Communications, Inc., Richardson, Tex.; Fujitsu Limited, Kawasaki, Japan

[21] Appl. No.: 08/714,793

[22] Filed: Sep. 13, 1996

Related U.S. Application Data

[60] Provisional application No. 60/003,761, Sep. 14, 1995.

[51] Int. Cl.⁶ .................................................. H04L 12/54
[52] U.S. Cl. ......................... 370/235; 370/236; 370/429
[58] Field of Search .................................... 370/229–240, 370/253, 412, 417, 428, 429

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,715,030 | 12/1987 | Koch et al. | 370/85 |

(List continued on next page.)

FOREIGN PATENT DOCUMENTS 4-84943  3/1992  Japan .

OTHER PUBLICATIONS

An Ascom Timeplex White Paper, *Meeting Critical Requirements with Scalable Enterprise Networking Solutions Based on a Unified ATM Foundation*, pp. 1–12, Apr. 1994–1995?.

Douglas H. Hunt, *ATM Traffic Management—Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994.

Flavio Bonomi et al., *The Rate–Based Flow Control Framework for the Available Bit Rate ATM Service,* IEEE Network, Mar./Apr. 1995, pp. 25–39.

R. Jain, *Myths About Congestion Management in High Speed Networks,* Internetworking Research and Experience, vol. 3, 101–113 (1992).

Douglas H. Hunt et al., *Credit–Based FCVC Proposal for ATM Traffic Management (Revision R1)*, ATM Forum Technical Committee Traffic Management Subworking Group, ATM_Forum/94–0168R1, Apr. 28, 1994.

(List continued on next page.)

*Primary Examiner*—Melvin Marcelo
*Attorney, Agent, or Firm*—Weingarten, Schurgin, Gagnebin & Hayes LLP

[57] ABSTRACT

A flow control technique for wide area ATM networks is disclosed in which allocation of buffers in a receiver switch is controlled by a transmitter switch. The receiver switch periodically transmits feedback messages to the transmitter switch indicatative of the state of fullness of the receiver switch buffers. The transmitter switch calculates updated receiver buffer fullness based upon the feedback message and the number of cells transmitted from the transmitter switch to the receiver switch since the feedback message was sent. Transmission of cells from the transmitter switch to the receiver switch is then controlled in accordance with an allocation technique, thereby allocating buffers in the receiving switch. The technique may be a roll-off technique in which the number of buffers available to each flow in the transmitter switch is reduced geometrically as the updated receiver buffer state is calculated to be more full. The flow control technique may be applied on either a per link or a per flow basis.

38 Claims, 4 Drawing Sheets

U.S. PATENT DOCUMENTS

| | | | |
|---|---|---|---|
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Proctor et al. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Faulk, Jr. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 255/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |

| | | | |
|---|---|---|---|
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et al. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,731 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/60.1 |
| 5,452,299 | 9/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda | 371/67.1 |
| 5,461,611 | 10/1995 | Drake, Jr. et al. | 370/54 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |

OTHER PUBLICATIONS

Douglas H. Hunt et al., *Action Item Status for Credit–Based FCVC Proposal,* ATM Forum Technical Committee Traffic Management Subworking Group, ATM_Forum/94–0439, Apr. 28, 1994.

Timothy P. Donahue et al., *Arguments in Favor of Continuing Phase 1 as the Initial ATM Forum P–NNI Routing Protocol Implementation,* ATM Forum Technical Committee, ATM Forum/94–0460, Apr. 28, 1994.

Richard Bubenick et al., *Leaf Initiated Join Extensions,* Technical Committee, Signalling Subworking Group, ATM Forum/94–0325, Apr. 28, 1994.

Rob Coltun et al., *PRP: A P–NNI Routing Protocol Proposal,* ATM Forum Technical Committee, ATM_Forum/94–0492, Apr. 28, 1994.

Richard Bubenik et al., *Leaf Initiated Join Extensions,* ATM Forum Technical Committee, Signalling Subworking Group, ATM Forum 94–0325, Apr. 28, 1994.

Richard Bubenik et al., *Requirements For Phase 2 Signaling Protocol,* ATM Forum Technical Committee, Signalling Subworking Group, ATM Forum 94–1078, Jan. 1, 1994.

H.T. Kung and K. Chang, *Receiver–Oriented Adaptive Buffer Allocation in Credit–Based Flow Control for ATM Networks,* Proceedings of INFOCOM '95, Apr. 2–6, 1995, pp. 1–14.

H.T. Kung et al., *Credit–Based Flow Control for ATM Networks: Credit Update Protocol, Adaptive Credit Allocation, and Statistical Multiplexing,* Proceedings of ACM SIGCOMM '94 Symposium on Communications Architectures, Protocols and Applications, Aug. 31–Sep. 2, 1994, pp. 1–14.

SITA, ATM RFP: C–Overall Technical Requirements, Sep. 1994.

*Head of Line Arbitration in ATM Switches With Input–Output Buffering and Backpressure Control.* by Hosein F. Badran and H. T. Mouftah, *GLOBECOM* '91, pp. 0347–0351.

TRANSMITTER CONTROLLED FLOW CONTROL FOR BUFFER ALLOCATION IN WIDE AREA ATM NETWORKS

RELATED CASE INFORMATION

Priority is claimed to U.S. Provisional Application Ser. No. 60/003,761, entitled COMMUNICATION METHOD AND APPARATUS, filed Sep. 14, 1995.

FIELD OF THE INVENTION

The present invention is related to ATM network switches, and more particularly to a technique for implementing flow control in a wide area ATM network to allow reduced buffer size while assuring no cell loss.

BACKGROUND OF THE INVENTION

Flow control is required for Asynchronous Transfer Mode ("ATM") networks which provide best effort type service such as Available Bit Rate ("ABR") service. An ABR connection competes for shared buffers with a number of other connections, and consequently no single ABR connection is typically guaranteed a particular amount of buffer space. It is therefore important to have knowledge of how many buffers are available in order to control flow such that the buffers do not overflow. If the number of cells transmitted exceeds the number of available buffers, some cells will be lost.

It is known to reduce the possibility of cell loss by providing feedback from a receiving switch to a transmitting switch to indicate how many buffers are available in the receiving switch. In such a system the delay between the time at which the transmitter sends a cell and a complementary feedback message can be received by the transmitter, i.e., the round trip time ("RTT") between transmitter and receiver, becomes a factor in determining minimum buffer size for allowing efficient utilization of network trunks. More particularly, for a link of N flows and bandwidth B, the buffer may be sized to be the product of N, B and RTT, which is large enough for a "worst case scenario."

Such buffer sizing techniques become problematic, however, in the case of Wide Area Networks ("WANs"). Because of the larger physical distances covered by WANs, RTT becomes relatively large in WAN implementations, e.g., approximately 50 msec for the case of eastern United States and western United States. The buffer sizing using the "worst case scenario" dictates a buffer size (N×B×RTT) which is impractically large for such values of RTT.

The worst case scenario buffer size can be reduced by forwarding information from the receiver to the transmitter regarding availability and usage of buffers, and permitting transmissions from the transmitter to the receiver based upon such feedback information. However, in such a system in which transmissions are permitted based solely upon such feedback information from the receiver, undesirable oscillations in buffer utilization may occur due to the latency associated with the feedback information. Additionally, such latency can result in overallocation of buffers or underallocation of buffers.

SUMMARY OF THE INVENTION

In accordance with the present invention, allocation of buffers in a receiver switch is controlled by a transmitter switch. Control within the transmitter switch is executed according to an allocation technique which both avoids cell loss and allows use of buffers of practical size in the receiver switch. The receiver switch periodically transmits feedback messages to the transmitter switch indicative of the state of fullness of buffers in the receiver switch. Such feedback messages could contain, for example, the number of available buffers, the number of cells held for each connection, or the number of buffers freed. The transmitter switch maintains a record of the number of cells transmitted to the receiver in a previous time period, typically since the last feedback message was generated in the receiver and sent to the transmitter. The transmitter switch then calculates an updated receiver buffer state and transmits cells accordingly. The updated receiver buffer state is calculated based upon the latest feedback message and the number of cells transmitted from the transmitter switch to the receiver switch since the latest feedback message was generated in the receiver, as indicated by the record in the transmitter switch. The transmitter thus calculates maximum buffer fullness, not accounting for draining which may have occurred since the latest feedback message was generated.

Once the updated receiver buffer state is calculated, transmission of cells from the transmitter switch to the receiver switch is controlled in the transmitter switch based upon an allocation technique. The technique may be a roll-off technique in which the number of buffers available to each flow in the transmitter switch is reduced as the updated receiver buffer state is calculated to be more full. Each flow may be more aggressively reduced as the updated receiver buffer state is calculated to be more full in order to compensate for feedback delay and stale information regarding receiver buffer drainage. In the above described manner, allocation of buffers in the receiver switch is controlled by the transmitter switch.

The transmitter controlled flow control technique permits fast ramp-up for new flows or previously quiescent flows, and allows lossless operation with a reduced receiver buffer size in WANs. Since receiver buffer fullness is not accurately represented by the feedback message due to information staleness, the transmitter switch determines how many cells may be sent to the receiver switch based upon more accurate information available only at the transmitter. Such information obviates the need for the worst case size receiver buffer employed in some prior art networks. Further, buffer usage oscillations can be controlled by operating according to progressively more conservative fullness calculations in accordance with the roll-off technique.

As the receiver buffer becomes more full, progressive roll-off provides better performance for a given buffer size. More particularly, for a given buffer size and RTT, as the number of supported connections increases, there is no discontinuity in performance.

BRIEF DESCRIPTION OF THE DRAWING

The invention will be more fully understood in view of the following detailed description in conjunction with the drawing in which.

DETAILED DESCRIPTION OF THE INVENTION

Figure 1:
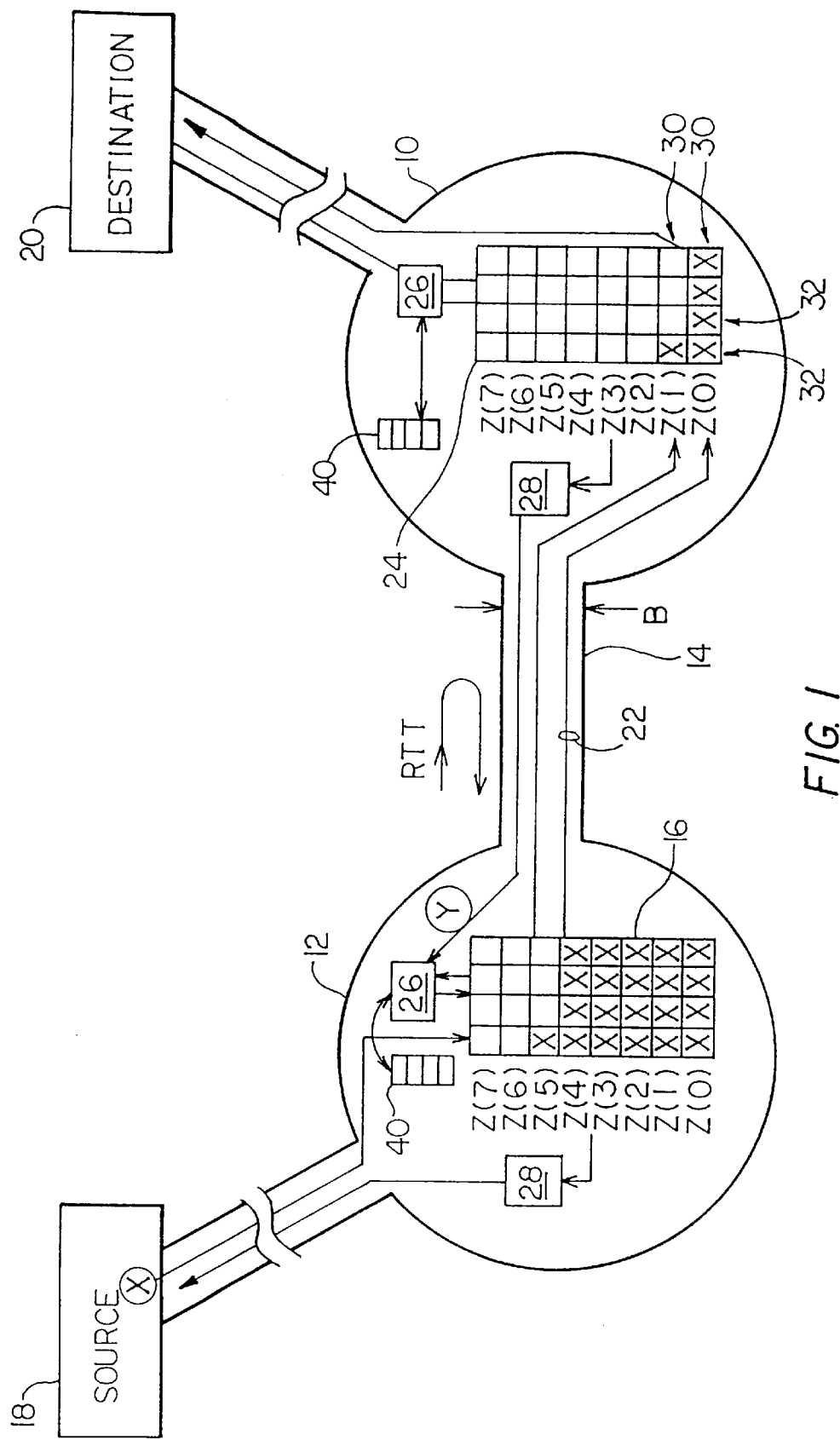
FIG. 1 illustrates a portion of a WAN wherein transmitter switch control of receiver resources is implemented.

FIG. 1 illustrates an Asynchronous Transfer Mode ("ATM") network in which allocation of buffer resources in a receiving switch 10 is controlled by a transmitting switch 12. The transmitting switch and the receiving switch are in communication via a connecting link 14 of bandwidth "B" through which data cells 16 are sent from the transmitting switch to the receiving switch while traveling from source 18 to destination 20 within the network. Cells in a connection between the source and the destination travel within a flow 22, and the link may include a plurality of flows. Each received data cell is temporarily placed in a buffer pool 24 (the state of fullness of which is shown as viewed from the perspective of the transmitter) upon entering the receiving switch. The data cell may then be transmitted from the receiving switch to another switch through another flow and another link. As such, the data cell travels from the source to the destination through a plurality of switches and interconnecting links.

To support switch flow control each switch includes an allocation controller 26 and a feedback controller 28, each buffer pool 24 is divided into a plurality of zones 30, and each flow is associated with a virtual buffer 32 according to which zone 30 is active. The feedback controller 28 of the receiving switch functions to provide feedback data to the allocation controller of the transmitting switch. The feedback data includes a credit cell which indicates the state of fullness of the buffer pool. Such credit cell could contain, for example, the number of available buffers, the number of cells held for each connection, and the number of buffers freed. The zones of the buffer pool fill and drain sequentially, and hence the feedback data is also indicative of which zone is actively being utilized. Knowledge of any zone structures need be maintained only in the transmitter switch. The allocation controller in the transmitter switch maintains a record of the number of cells transmitted to the receiver over a previous time period, typically since the latest feedback message was generated in the receiver and sent to the transmitter by the receiver. When the feedback message is received, the allocation controller calculates an updated receiver buffer state which indicates the state of the receiver buffer when cells transmitted to the receiver from the transmitter since the feedback data was generated are taken into account. The updated receiver buffer state is calculated based upon the feedback message and the number of cells transmitted from the transmitter switch to the receiver switch since the feedback message was sent as indicated by the record maintained by the allocation controller. The allocation controller then implements a buffer allocation technique based upon the updated state information. These techniques are applicable to all connections within the link, and to the link itself.

Figure 2:
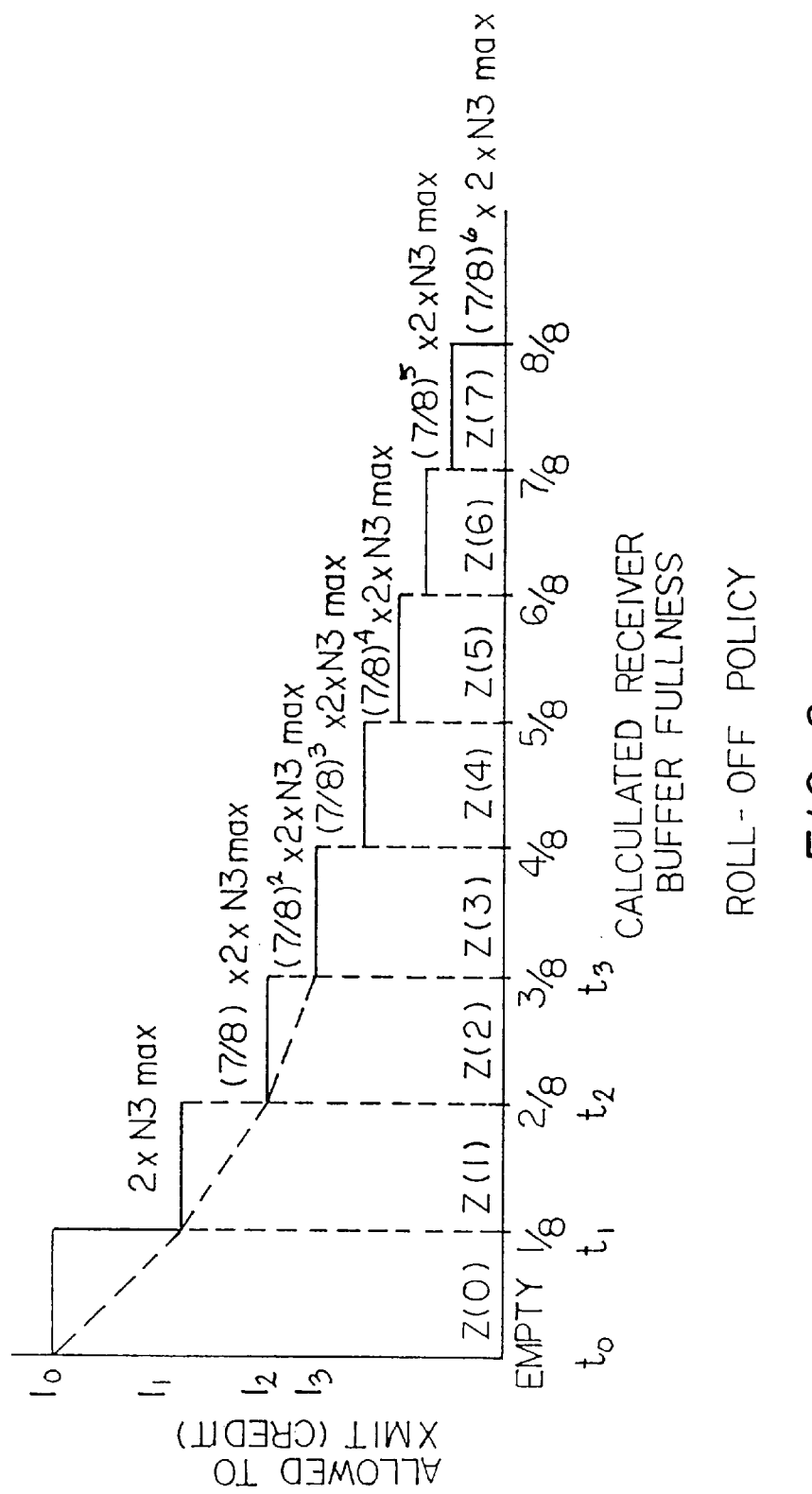
FIG. 2 illustrates a technique for controlling transmission of cells from the transmitter switch of FIG. 1.

Referring now to FIGS. 1 and 2, the allocation technique may be a roll-off technique which decreases arithmetically, geometrically or otherwise such that the change in the maximum number of data cells that can be transmitted divided by the change in buffer fullness, i.e., the slope, decreases as buffer fullness increases. The zones 30 represent in the transmitter the portion of the physical buffer 24 in the receiver currently holding unforwarded cells. As cells are received in the physical buffer, buffer occupancy crosses thresholds ($t_1$, $t_2$, $t_3$ etc.), moving into successively more restrictive zones wherein each flow has a successively smaller virtual buffer ($l_1$, $l_2$, $l_3$ etc.) such that the absolute magnitude of $(l_i-l_{i+1})/(t_i-t_{i+1})$ is greater than the absolute magnitude of $(l_{i+1}-l_{i+2})/(t_{i+1}-t_{i+2})$. When cells drain out of the physical buffer, occupancy crosses thresholds in the opposite direction, moving into successively more permissive zones wherein each flow has a successively larger virtual buffer. The roll-off technique is thus credit based rather than rate based, and although the average rate of an individual flow has a ceiling imposed thereon, the flow can burst at the full link bandwidth.

In an exemplary roll-off technique a set of N flows share the link between the transmitter switch and the receiver switch. Each time the receiver switch 10 has forwarded "N2" cells, where N2 is a positive integer, a feedback message may be transmitted from the receiver switch to the transmitter switch indicating the fullness of the receiver switch buffer 24. The receiver switch buffer is divided, for example, into eight zones: $Z(0)$, $Z(1)$, $Z(2)$, $Z(3)$, $Z(4)$, $Z(5)$, $Z(6)$, $Z(7)$. The zones decrease in size by a linear, geometric or similar progression such that the sum of the zones has a reasonable upper bound which is a small integer multiple of a value "N3." A round trip delay ("RTT") is defined to be the delay between the time at which the transmitter sends a cell and a complementary feedback message can be received by the transmitter. Letting "N3max" be the maximum N3 value used, such as the full link rate times the round trip delay (B×RTT), and letting, for example, $Z(0)=2\times N3max$ with each successive $Z(i)$ geometrically reduced by $7/8$: $Z(1)=7/8\times 2\times N3max$, $Z(2)=(7/8)^2\times 2\times N3max$, $Z(3)=(7/8)^3\times 2\times N3max$, and so on such that $\Sigma Z(i)=8\times 2\times N3max$. Hence, the size of each zone is the product of a reduction factor and 2×B×RTT.

In an alternative embodiment zone size is based on a larger multiple of B×RTT. When a given zone 30 becomes half full, for example when $Z(0)$ contains N3max cells, the receiver switch 10 modifies the feedback message to provide only $7/8$ as much credit. When the physical buffer 24 drains down to a beginning edge of a zone 30, the receiver switch modifies the feedback message to provide $8/7$ as much credit. Such thresholds provide a hysteresis mechanism. When the physical buffer is in the $Z(0)$ zone, the switch operates in standard fashion. However, when the receiver switch moves into zone $Z(1)$ credit updates sent to any flow contain a MinC value (current zone's ceiling), rather than a "C" value (C=number of free cells per flow, which is $\leq N2+N3max$). In such a case the receiver is in zone $Z(1)$, and the ceiling is $N2+7/8\times N3max$, so the credit ceiling is lowered by a factor of $7/8$.

In order to assure that quiescent flows, i.e., those flows which are not sending and not getting credit updates every N2 cell times, adjust to changes in the credit ceiling, all flows receive credit updates. However, such credit updates may be provided as background updates at a frequency less than every N2 cell times, e.g., every K×N2 cell times, and these background updates may be staggered in order to smooth the processing load. Thus, the transmitter switch updates its credit count based on the last value received in the credit cell. The receiver switch also sends the credit update, given that the flow is actually draining.

This quiescent flow technique presents one complication since the receiver switch may cross a zone boundary at the same time as the transmitter receives feedback for a particular quiescent flow. If the receive buffer is filling up, a quiescent flow that then starts sending may have an estimate of the credits available that is temporarily high, and if the receive buffer is draining the flow may have an estimate that is temporarily low. However these differences are temporary since credit updates are periodically sent on all flows regardless of whether the flow is draining or not. Hence, within about K×N2 cell times any flow should be current.

Figure 3:
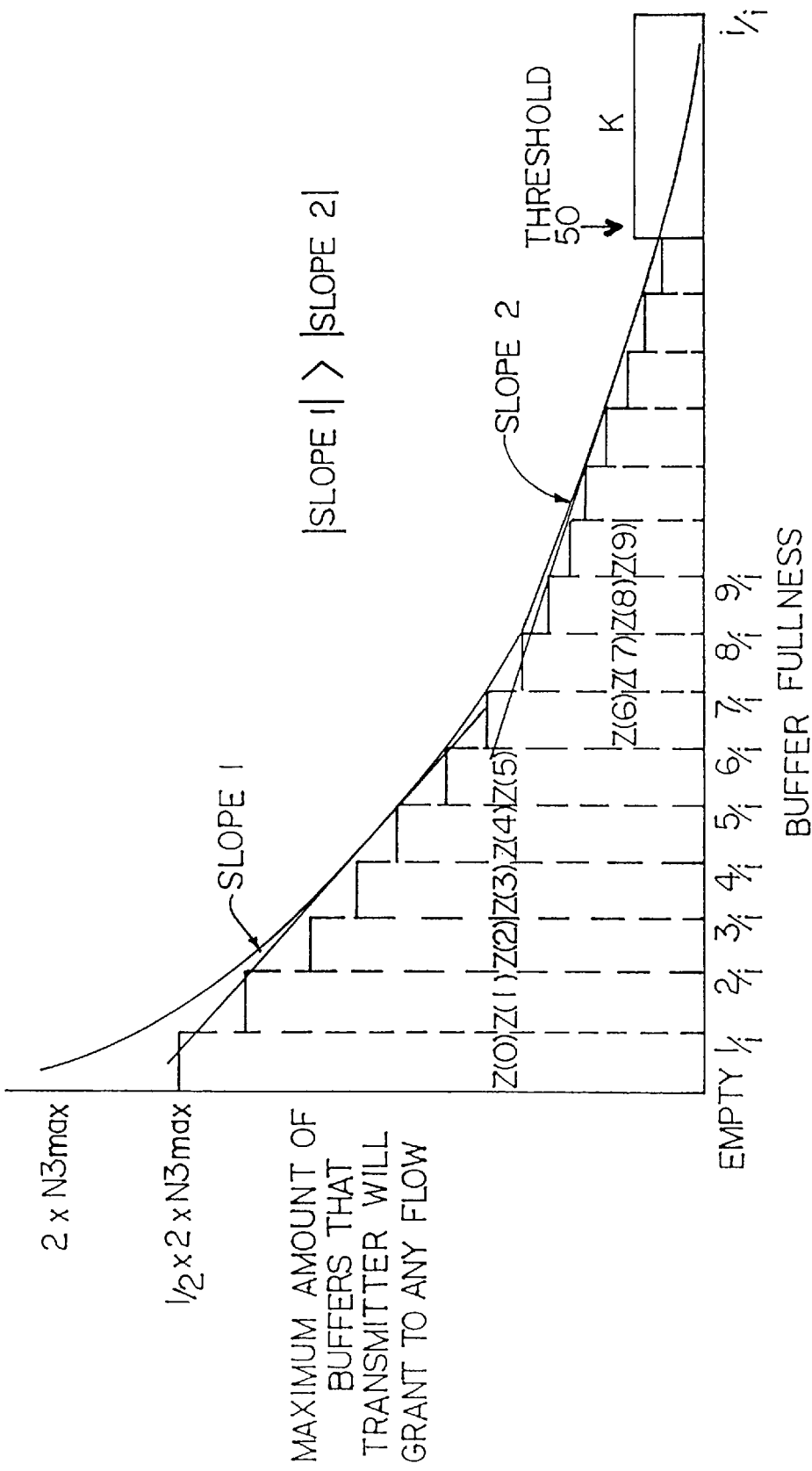
FIG. 3 illustrates an alternative technique for controlling transmission of cells from the transmitter switch.

Referring to FIG. 3, in an alternative embodiment the zones decrease geometrically based upon a different reduction factor. More particularly, through roll-off each successive zone Z(i) is successively reduced as: Z(0)=2×N3max, Z(1)=½×2×N3max, Z(2)=¼×2×N3max, Z(3)=⅛×2×N3max, Z(4)=1/16×2×N3max, and so on such that ΣZ(i)=2×2×N3max. Other zone sizing techniques and reduction factors may also be implemented as will be apparent to those skilled in the art to achieve desired performance characteristics. Further, although models with discreet zones have been illustrated, it would be possible to implement a single zone which changes continuously with fullness.

To avoid a deadlock condition, an additional check may be implemented. More particularly, if the sum of the buffer usage by the connections exceeds a threshold 50, then the transmitter enters a "halt & go" mode in which each "protected" connection can transmit up to a fixed number of cells (k), and must wait for feedback before further transmitting. This check is implemented in addition to the control described above. Thus, a connection with a limit less than k does not receive a net buffer gain as a result of buffer usage exceeding the threshold.

Figures 4, 5:
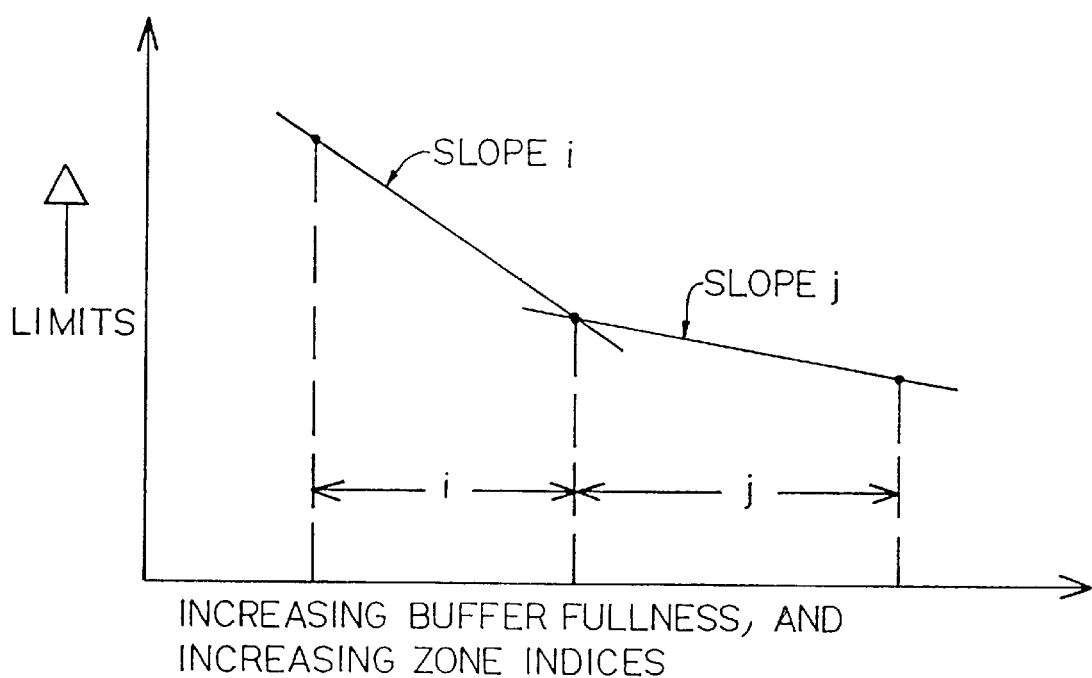
FIG. 4 illustrates the organization of a table and a zone pointer employed to implement the technique illustrated in FIG. 2.
FIG. 5 illustrates another alternative technique for controlling transmission of cells from the transmitter switch of FIG. 1.

As shown in FIGS. 1 and 4, the zones can be table driven, with each switch including a table 40. Each table includes entries which contain limits defining the beginning and ending points of the respective zones. In the present embodiment the limits are selected such that subsequent zones are progressively smaller. The table is indexed by a zone pointer which indicates the active zone. Table entries are predetermined when the network is configured, but the tables are preferably reconfigurable to allow for network reconfiguration and fine tuning.

Given the following data structures and definitions, buffers are allocated in accordance with the pseudocode below:

```
BLT[i,p]: Buffer Limit Table Arrays
    where i = index, p = profile
Index[i]: Index Array
    where i = connection ID and Index[i] has an integer
        value that may be increased or
        decreased as required
BAPQ: Buffer Access Priority Queue
Deficit[c]: Deficit Array
        where c = connection ID
BSU: Buffer State Update
BFS: Buffer free space
B_Max: Buffer space available
TX_i: Cells transmitted for connection i
Fwd_i: Cells forwarded by receiver for connection i
N: Upper bound on the value of the Index Array
    where N represents the Number of Zones - 1 that the
        shared buffer is divided into.
Deficit[i]: Deficit, a positive integer that starts at
        zero and may be incremented and
        decremented
N2: Receiver sends a new update upon receipt of N2
        cells
RTT: Round Trip Travel Time of Link
B: Bandwidth of Link
N3: B*RTT
Management
Buffer free space is calculated as:
BFS = B_Max - Sum over 1 connections (TX_i - Fwd'_i)
    where Fwd'_i is the most recent value of Fwd_i supplied
        by receiver to transmitter
Index is calculated as:
Index[i] = least integer containing (N*(TX_i - Fwd'_i)/B_Max)
Buffer Usage Control
If (TX_i - Fwd'_i) < BLT[i,p]
    THEN IF technique prevents transmission based on prior
        usage, e.g., Deficit[i] > 0
    THEN record transmitter-local technique
        information, e.g., decrement
            Deficit[i]
        Insert this request in BAPQ at priority =
            Deficit[i]
        Allow transmission from top of BAPQ
    ELSE allow transmission for this request, based on
        prior usage, e.g., when Deficit[i] = 0)
ELSE record transmitter-local technique information,
    e.g., increment Deficit[i]
Pool Apportioning
IF a new connection arrives
    THEN B_Max = B_Max + N2
        Increase the indices to provide more conservative
            operation if needed
Note: It may not be possible to accept the connection if
        indices cannot be
        increased
If a connection leaves
    THEN B_Max = B_Max - N2
        Decrease the indices to provide more aggressive
            operation if desired
Deadlock Avoidance
IF Sum over 1 connections (Tx_1- Fwd'_1) > B_Max
    THEN go into Halt-and-Go mode, where a connection can
        transmit only a bounded number
        of cells (k) and must wait for
        additional BSUs before further
        transmission
Note: This check is in addition to BLT controls
```

With regard to the pseudocode, Tx_Count and Fwd_Count are maintained in free running counters and hence the flow control technique is tolerant to loss of control information. More particularly, Fwd_Count is maintained in a free running counter in the receiver and is incremented each time a buffer is freed, and Tx_Count is maintained in a free running counter in the transmitter and is incremented each time a cell is transmitted. The difference, Tx_Count-Fwd_Count, can then be compared to a limit for implementation of the flow control technique without requiring knowledge of when the credit cell was generated in the receiver.

Referring to FIG. 5, in an alternative embodiment the roll-off technique encompasses the broad class of functions to limit buffer size. There exists adjacent intervals "i" and "j", where interval "i" contains one or more lower-numbered zones, and interval "j" contains one or more higher-numbered zones, such that the average reduction in limits over interval "i" is greater than the average reduction in limits over the interval "j". That is, the absolute magnitude of "slope$_i$" is greater than the absolute magnitude of "slope$_j$".

It will be understood that various changes and modifications to the above described method and apparatus may be made without departing from the inventive concepts disclosed herein. Accordingly, the present invention is not to be viewed as limited except as by the scope and spirit of the appended claims.

We claim:

1. A method for allocating buffers in a data transmission system comprising a communication path, a transmitter element in communication with said communication path, a receiver element in communication with said communication path, and a buffer pool comprising a plurality of buffers for storing data cells received at said receiver element from said transmitter element over said communication path, said method comprising the steps of:

storing in a table in said transmitter element at least two records, each of said at least two records containing at least a first field containing a threshold number ($t_i$)

indicative of the fullness of said buffer pool and a second field indicative of the maximum number of data cells ($l_i$) that may be transmitted by said transmitter element to said receiver element over said communication path if the number of buffers unavailable is between $t_i$ and $t_{i-1}$, wherein $l_0$ is predetermined and the number stored in the second field of each subsequent record is selected such that $(l_i-l_{i+1})/(t_i-t_{i+1})$ is greater than $(l_{i+1}-l_{i+2})/(t_{i+1}-t_{i+2})$;

calculating in said transmitter element a number indicative of an approximation of the fullness of said buffer pool in said receiver element;

using said approximation number to identify within said table the maximum number of data cells which may be transmitted from said transmitter element to said receiver element; and transmitting from said transmitter element to said receiver element for storage in said buffer pool, a plurality of data cells wherein said transmission includes no more than the maximum number of data cells specified in said table based upon said approximation number.

2. The method of claim 1 wherein the communication path is a link which hosts a plurality of connections, and including the further step of applying the maximum number to each connection hosted by the communications link.

3. The method of claim 1 including the further step of periodically sending, by the receiver element to the transmitter element, a feedback message indicative of the fullness of the buffer pool in the receiver element.

4. The method of claim 3 including the further step of tallying, in the transmmitter element, the number of data cells transmitted to the receiver.

5. The method of claim 4 including the further step of combining the feedback message and the tally to index the table.

6. The method of claim 1 including the further step of implementing a secondary flow control technique when receiver buffer fullness exceeds a predetermined threshold.

7. The method of claim 6 including the further step of, when receiver buffer fullness exceeds the predetermined threshold, allowing designated connections in the transmitter to transmit up to a fixed number of cells and halting further transmission until receipt of a feedback message indicating that buffers have been freed.

8. The method of claim 7 including the further step of, when receiver buffer fullness exceeds the predetermined threshold, allowing designated connections in the transmitter to transmit, upon receipt of feedback indicating that sufficient buffer space has been freed in the receiver, up to the lesser of:

a predetermined fixed number of cells; and the number of cells indicated by employing the table.

9. A flow-controlled communications system comprising:

a communications path for conveying data and update cells, said communications path hosting plural connections;

a transmitter element, in communication with said communications path, for transmitting data cells onto said communications path and receiving update cells from said communication path for each of said connections; and a receiver element, in communication with said communications path, for receiving said data cells from said communications path and transmitting update cells onto said communications path for each of said connections, said receiver element comprising a plurality of buffers for storing said data cells received over said communications path for said connections, wherein said transmitter element dynamically determines, based upon information available at said transmitter, a maximum number of said data cells that can be transmitted to said receiver element for storage in said buffers for each connection, and wherein the change in the maximum number of data cells that can be transmitted divided by the change in buffer fullness decreases as buffer fullness increases.

10. The communications system of claim 9 wherein said communications path has a bandwidth "B" and individual connections of said plural connections can burst transmit at said bandwidth "B".

11. The communications system of claim 10 wherein said dynamically determined maximum number of said data cells that can be transmitted to said receiver element for storage in said buffers is identical for each connection of said plural connections.

12. The communications system of claim 9 wherein said transmitter element dynamically adjusts, based upon information available at said transmitter, a maximum number of said data cells that can be transmitted to said receiver element for storage in said buffers for said communications path.

13. The communications system of claim 12 wherein said receiver element is in communication with a plurality of transmitter elements through a plurality of communication paths and said adjusted maximum number of said data cells that can be transmitted to said receiver element for storage in said buffers is identical for each communication path of said plurality of communication paths.

14. The communications system of claim 9 wherein said transmitter element dynamically adjusts said maximum number in accordance with a technique based upon calculated fullness of said plurality of buffers of said receiver element.

15. The communications system of claim 14 wherein said receiver element periodically sends a feedback message to said transmitter element, said feedback message being indicatative of actual fullness of said plurality of buffers.

16. The communications system of claim 15 wherein said transmitter element tallies the data cells transmitted to said receiver element since at least the time of generation of the latest feedback message received in said transmitter element, thereby providing a tally.

17. The communications system of claim 16 wherein said tally is employed to update said feedback message to calculate an updated receiver buffer state.

18. The communications system of claim 17 wherein said updated receiver buffer state is employed to control flow in accordance with a roll-off technique in which the number of buffers available to each connection in the transmitter element is reduced as the updated receiver buffer state is calculated to be more full.

19. The communications system of claim 18 wherein said buffers are divided into a plurality of zones, $Z(0)$ to $Z(n)$, that are sequentially filled from $Z(0)$ to $Z(n)$ as cells accumulate in said buffers, the zone being utilized at a given time being the active zone.

20. The communications system of claim 16 wherein said tally is maintained in a first free running counter located in said transmitter element, said first counter being incremented each time a cell is transmitted from said transmitter element.

21. The communications system of claim 20 wherein said feedback message contains a number maintained in a second free running counter located in said receiver element, said second counter being incremented each time a buffer is freed in said receiver element.

22. The communications system of claim 19 wherein the zones diminish in size from zone Z(0) to zone Z(n).

23. The communications system of claim 22 wherein the sum of the zones has an upper bound that is an integer multiple of a value "N3".

24. The communications system of claim 23 wherein N3 is equal to the product of the bandwidth of the communications path and the delay between the time at which the transmitter element sends a data cell and the time a complimentary feedback message is received by the transmitter element.

25. The communications system of claim 24 wherein zone Z(0) is twice the value of N3.

26. The communications system of claim 25 wherein there are eight zones, and each successive zone from Z(0) to Z(7) is reduced in size by a factor of one-eighth.

27. The communications system of claim 25 wherein a feedback message is sent for each active connection every N2 time periods.

28. The communications system of claim 27 wherein a feedback message is sent for each quiescent connection less frequently than every N2 time periods.

29. A method for determining, at a point in time, a maximum number of data cells that can be transmitted by a transmitter element across a communications link to a receiver element for a single connection hosted by the communications link, wherein the receiver element comprises plural buffers, said method comprising the steps of:

determining, at the transmitter element, a first number identifying the number of data cells that have been transmitted by the transmitter element to the receiver element via the communications link for the connection;

transmitting at the receiver element for receipt by the transmitter element, a second number indicative of the number of buffers available for storing data cells at the time such number was transmitted by the receiver element;

receiving the second number at the transmitter element; and employing the first and second numbers to calculate a maximum number of cells that can be transmitted by the transmitter element to the receiver element for a respective connection by indexing a first table stored in memory associated with the transmitter element by utilizing the first and second numbers, the first table having a plurality of indexed entries indicating the maximum number of cells that can be transmitted by the transmitter element to the receiver element for a respective connection, wherein a roll-off technique is implemented in the first table in which the number of buffers available to each connection in the communications link is reduced at a greater rate than the receiver buffer state as indicated by the first and second numbers.

30. The method of claim 29 including the further step of applying the maximum number to each connection hosted by the communications link.

31. The method of claim 30 including the further step of indexing a second table to determine a maximum number of data cells that can be transmitted for the communications link.

32. The method of claim 31 including the further step of setting entries in the table to dynamically adjust the maximum number in accordance with a technique based upon calculated fullness of the plurality of buffers of the receiver element.

33. The method of claim 32 including the further step of periodically sending, by the receiver element, a feedback message including the second number to the transmitter element.

34. The method of claim 33 including the further step of combining the first number and second number to index the second table.

35. The method of claim 29 including the further step of dividing the buffers into a plurality of zones, Z(0) to Z(n), that are sequentially filled from Z(0) to Z(n) as cells accumulate in the buffers such that only one zone is actively utilized at a given point in time, the zones decreasing in size from Z(0) to Z(n).

36. The method of claim 29 including the further step of implementing a secondary flow control technique when receiver buffer fullness exceeds a predetermined threshold.

37. The method of claim 36 including the further step of, when receiver buffer fullness exceeds the predetermined threshold, allowing designated connections in the transmitter to transmit up to a fixed number of cells and halting further transmission until receipt of a feedback message indicating that buffers have been freed.

38. The method of claim 36 including the further step of, when receiver buffer fullness exceeds the predetermined threshold, allowing designated connections in the transmitter to transmit, upon receipt of feedback indicating that sufficient buffer space has been freed in the receiver, up to the lesser of:

a predetermined fixed number of cells; and the number of cells indicated by employing the first and second numbers to index the first table.

* * * * *